(No Model.) 2 Sheets—Sheet 1.
S. V. RAWLINGS.
AUTOMATIC THROTTLE FOR ENGINES.
No. 501,959. Patented July 25, 1893.
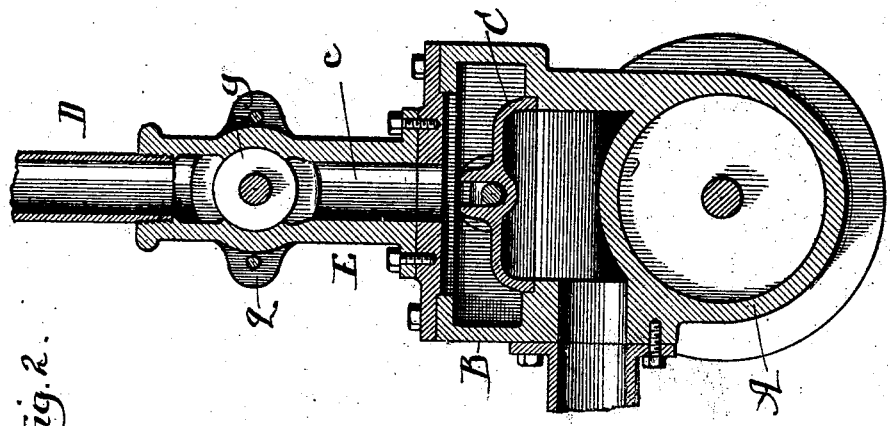
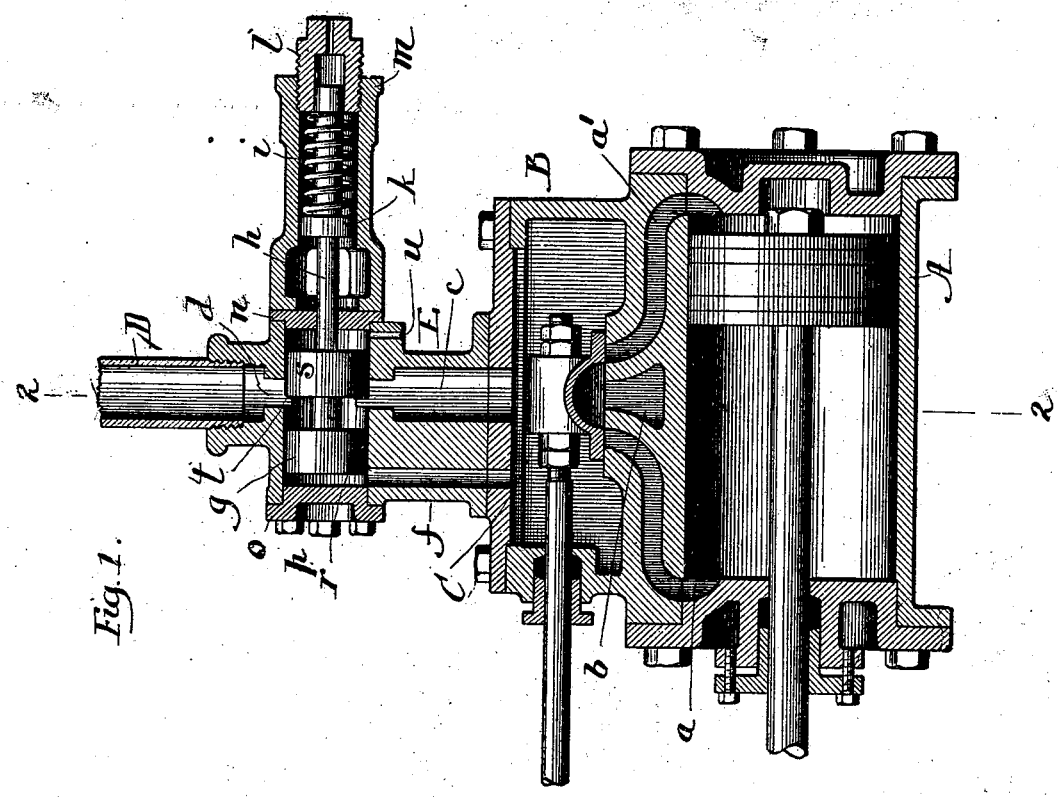
Witnesses:
Fred Gerlach
Henry E. Berling
Inventor:
Samuel V. Rawlings
By Fisher
Attorneys.

(No Model.) Sheets—Sheet 2.
S. V. RAWLINGS.
AUTOMATIC THROTTLE FOR ENGINES.
No. 501,959. Patented July 25, 1893.
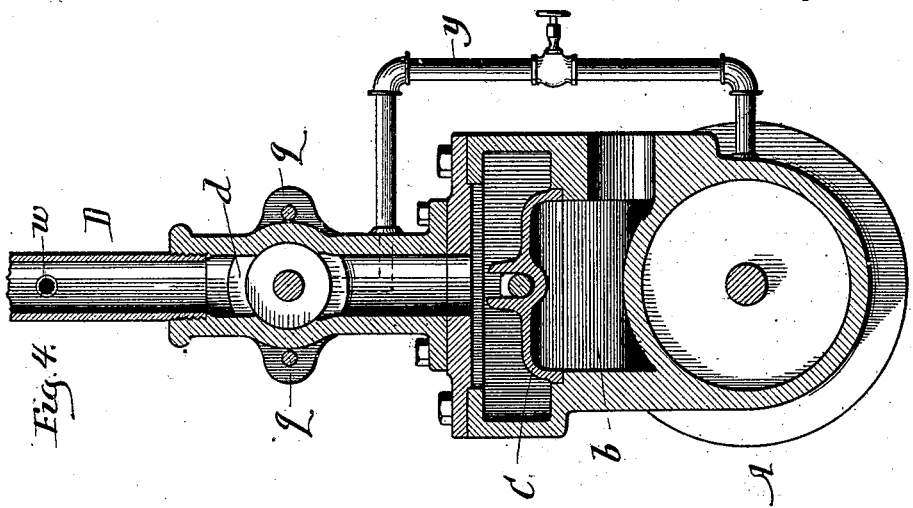
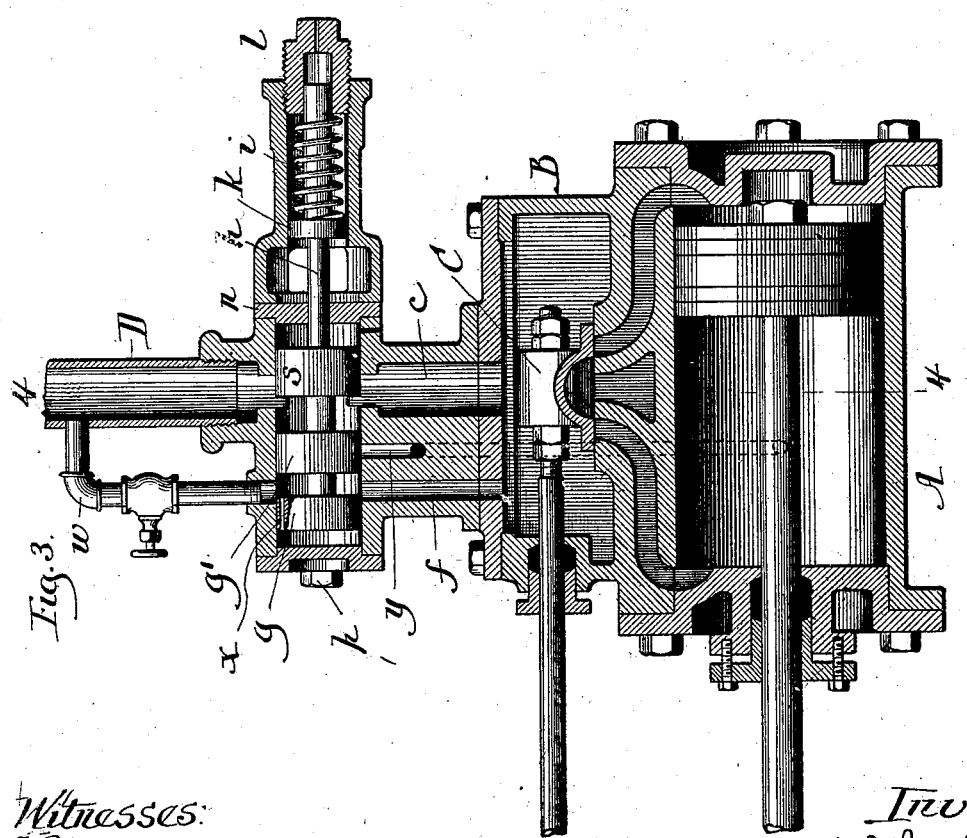
Witnesses:
Fred Gerlach
Henry E. Berling
Inventor:
Samuel V. Rawlings
By Beins & Fisher
Attorneys

UNITED STATES PATENT OFFICE.

SAMUEL V. RAWLINGS, OF MARQUETTE, ASSIGNOR OF ONE-HALF TO JOSEPH W. V. RAWLINGS, OF HOUGHTON, MICHIGAN.

AUTOMATIC THROTTLE FOR ENGINES.

SPECIFICATION forming part of Letters Patent No. 501,959, dated July 25, 1893.

Application filed January 21, 1893. Serial No. 459,069. (No model.)

*To all whom it may concern:*

Be it known that I, SAMUEL V. RAWLINGS, residing at Marquette, county of Marquette, State of Michigan, have invented certain new and useful Improvements in Automatic Throttles for Engines, of which the following is hereby declared to be a full, clear, and exact description, sufficient to enable others skilled in the art to make and use the same.

The invention designs to govern the run of an engine by regulating the feed of the motive agent. A throttle device interposed between the supply-pipe and the valve-chest and controlled from the chest-side of the supply responds to the differences in pressure there existing, according to the speed, i. e. whether the engine be running light or with a load, and thus modifies the feed automatically, in keeping with the duty.

The exact nature of the improvements will appear from the description following and be thereafter pointed out by claims at the conclusion.

In the drawings which accompany, like parts have like designation throughout.

Figure 1 is a view in longitudinal section of an engine having the improvements applied thereto. Fig. 2 is a cross section view thereof at line 2—2 of Fig. 1. Fig. 3 is a view similar to Fig. 1 but with the improvements modified. Fig. 4 is a cross section view at line 4—4 of Fig. 3.

In the selected form of the invention here detailed, the improvements are shown as embodied in an ordinary steam engine with a "cut off" slide valve at the chest. The cylinder A is furnished as shown with the ports $a\ a'$, exhaust passage $b$, chest B and slide valve C mounted thereon in position to cover the ports and exhaust passage in ordinary fashion. Interposed between the chest B and the supply pipe D is a box E, chambered as shown to afford main ports $c\ d$ which lead thence into the chest B and the supply pipe D respectively. A cylindric cross bore in the box E delivers into the main ports $c\ d$ and also into a supplemental port $f$ which latter at the other extremity opens freely into the chest B. Fitted within the cross bore is a disk or head $g$ from which extends a stem $h$ carrying thereon a re-action spring $i$, the ends whereof rest against a guide boss $k$ for the stem and an adjusting nut $l$. The hollow nut $l$ receives the terminal of the stem $h$ and is threaded to a bonnet $m$ retained in place with the heads $n\ o$ of the cross box by means of bolts and nuts $p$ which engage with the edges or lugs $q$ (Fig. 4) upon the heads and bonnet. By adjusting the nut $l$ the stem $h$ and its disk $g$ are shifted length-wise so that when the engine is at rest the edge $r$ of the disk nearly covers the supplemental port $f$. Conveniently carried by the stem $h$ is a throttle plug $s$, fitted in piston like fashion to the cross bore and located apart from the actuating disk $g$ at such distance that the edge $t$ of the plug nearly closes the ports $c\ d$ when the engine is at rest. A vent $u$ at the back of the plug $s$ allows for the escape of air when the plug is advancing to open position. On opening the ordinary globe valve (not shown) which regulates the feed of the motive agent, the steam proceeds by supply pipe D, port $d$ and past the edge $t$ of the plug $s$ and through the cross bore the companion port $c$ into the chest B where it gradually accumulates. The plug $s$ being in the position shown operates to "throttle" the steam supply at the cross bore and so continues until by shifting of the plug $s$ the entire area of the ports $c\ d$ is exposed. The motive agent in chest B passes by supplemental port $f$ back of the disk $g$ and tends thereby to advance the same together with the stem $h$ against the increasing resistance of the re-action spring $i$. This advance movement of the actuating disk $g$ changes the position of the throttle plug $s$ thereby opening the ports $c\ d$ farther and farther. If the engine be running light, i. e. without a load, it manifestly requires less steam to maintain a given speed. When the cylinder valve C is at mid-stroke as shown, the supply of steam to the cylinder through ports $a\ a'$, is cut off and the engine works expansively. At which juncture the motive agent accumulates in the chest B and through port $f$ advances the disk $g$ and thus shifts the throttle plug $s$ to further expose the ports $c\ d$. As the slide valve opens the cylinder ports $a\ a'$ the pressure at the chest B is relieved and since the engine is running light it is plain that with full supply of steam the motion will be materially accelerated and slide valve C reciprocate accordingly, much quicker. The rapid reciprocation relieves the pressure in chest B and with it the pressure at the back of the plug $g$ whereupon the latter retreats under the tension of its re-action spring $i$ and thus moves the throttle plug $s$ so as to cover more and more the ports $c\ d$. The feed of the motive agent is thereby decreased and the speed of the engine correspondingly reduced, as desired, in keeping with the absence of any duty thereon. If now the engine be loaded the first effect will be to delay the shift of the slide valve C and so far to permit the motive agent to accumulate in the chest B. The increased pressure passes by port $f$ to the back of the actuating disk $g$ shifting said disk and with it the throttle plug $s$ which latter opens wider the main ports $c\ d$ and increases the feed of the steam to the chest. The engine adapts itself to the added load so that the speed necessary thereto can be evenly maintained. The nut $l$ may be adjusted at will to vary the tension of the re-action spring $i$ and so far to modify the standard of pressure necessary in shifting the actuating disk $g$ and throttle plug $s$. Manifestly the device thus acts in measure as a pressure gage to determine the status of the motive agent in chest.

In the modified structure (Figs. 3 and 4) an additional passage or pipe $w$ opens from the supply pipe D and into the cross box at a point opposite the port $f$. A supplemental disk $g'$ is set upon the stem $h$ at a distance from its companion disk $g$ about equal to the width of the port $f$. A duct $x$ through disk $g$ serves as a lead between the chambers at front and back of said disk. An exhaust passage $y$ opens out from the cross cylinder and delivers into the main cylinder A or at the engine exhaust as desired. When starting the throttle plug $s$ may some times cover its ports $c\ d$ whereupon the cylinder pipe $w$ is opened to admit the motive agent from the supply pipe D into the cross cylinder and thence by duct $x$ to the back of the actuating disk $g$ thereby shifting said disk and compelling the throttle plug $s$ to open. If at any time the pressure becomes excessive, the shift of the disk $g$ finally closes the port $f$ while the companion disk $g'$ uncovers the channel $y$ whereupon the supplemental supply of steam discharges through duct X into the escape port $y$ thus relieving the pressure and permitting the throttle plug $s$ to resume its normal position in determining the feed of the main supply of steam to the chest B.

Manifestly changes in the details of structure or in the position of the parts and as well in the application of the improvements to various types of engine can be readily made according to the skill of the mechanic without departing from the spirit of the invention.

Having thus described the invention, what I claim as new, and desire to secure by Letters Patent, is—

1. The combination with the cylinder and with its chest and valve, of the supply-pipe the throttle-valve mechanism interposed between said pipe and chest and having an actuating port therefor communicating with the chest-side of the supply, whereby the variations in pressure of the motive-agent at such side automatically shift said throttle to modify the feed of the agent, substantially as described.

2. The combination with the cylinder and with its chest and valve, of the supply-pipe the throttle-valve mechanism interposed between said pipe and chest said mechanism comprising a case with port therein leading from the chest-side of the supply, an inclosed piston-stem with actuating head, a re-action spring, and a throttle plug proper shifted by said head to govern the communication from the supply-pipe to the chest, substantially as described.

3. The combination with the cylinder and with its chest, and valve of the supply-pipe and the throttle-valve mechanism interposed between said pipe and chest; said mechanism comprising a case with main ports for the supply-pipe and chest, a supplemental port leading from the chest side and a piston-stem with throttle-plug, actuating head and re-action spring inclosed by said case, said plug and head being located at the main and supplemental ports respectively, substantially as described.

4. The combination with the cylinder and with its chest, and valve of the supply-pipe and the throttle-valve mechanism interposed between said pipe and chest; said mechanism comprising a case with main-ports and supplemental ports both communicating with the supply-pipe and with the chest and a piston-stem with throttle-plug, actuating head and re-action spring inclosed by said case, said plug and head being located at the main and supplemental ports respectively, substantially as described.

5. The combination with the engine and its piston and with the motor supply-pipe of the throttle control mechanism interposed between said pipe and engine and having the actuating port therefor in communication with the engine side of the supply, whereby the variations in the pressure of the supply are caused to shift the throttle, substantially as described.

SAMUEL V. RAWLINGS.

Witnesses:
TROWBRIDGE JOHNS,
WILFRED ROSS.